United States Patent
Loman et al.

(10) Patent No.: US 10,938,449 B1
(45) Date of Patent: Mar. 2, 2021

(54) BATTERY COUPLED RADIO FREQUENCY IDENTITY (RFID)

(71) Applicant: Sprint Communications Company L.P., Overland Park, KS (US)

(72) Inventors: Clinton H. Loman, Raymore, MO (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 111 days.

(21) Appl. No.: 16/158,299

(22) Filed: Oct. 12, 2018

(51) Int. Cl.
*H01M 10/48* (2006.01)
*H04B 5/00* (2006.01)
*G06K 19/07* (2006.01)
*H01M 10/42* (2006.01)
*H04L 12/40* (2006.01)
*H01M 10/06* (2006.01)

(52) U.S. Cl.
CPC ....... *H04B 5/0062* (2013.01); *G06K 19/0702* (2013.01); *H01M 10/06* (2013.01); *H01M 10/425* (2013.01); *H04L 12/40* (2013.01); *H01M 2010/4278* (2013.01); *H01M 2220/20* (2013.01); *H04L 2012/40215* (2013.01)

(58) Field of Classification Search
CPC ............... H01M 10/06; H01M 10/425; H01M 2010/4278; H01M 2220/20
See application file for complete search history.

(56) References Cited

U.S. PATENT DOCUMENTS

2014/0134468 A1* 5/2014 Schaefer ............. H01M 10/425
429/90

OTHER PUBLICATIONS

Marquardt, Ronald, R., et al., "RFID Device with Two-Stage Power Harvesting," filed Sep. 17, 2020, U.S. Appl. No. 17/024,484.

* cited by examiner

*Primary Examiner* — Osei K Amponsah (57) ABSTRACT

A battery system. The battery system comprises an electric battery and a radio frequency identity (RFID) chip. The electric battery comprises an internal metal plate and an exterior package skin. The RFID chip is retained by the exterior package skin of the electric battery and comprises a non-transitory memory, a processor, a radio transceiver coupled to the processor, an antenna, a first impedance matching component coupling the radio transceiver to the antenna, and a second impedance matching component coupling the internal metal plate of the electric battery to the radio transceiver, wherein the radio transceiver is configured to transmit radio frequency signals through the second impedance matching component to the internal metal plate and the internal metal plate is configured to radiate the radio frequency signals as radio waves.

14 Claims, 3 Drawing Sheets

BATTERY COUPLED RADIO FREQUENCY IDENTITY (RFID)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Batteries provide electrical energy from chemical reactions. Some batteries are rechargeable and can be restored to a chemically energized state from a chemically de-energized state by applying a properly polarized voltage source to the terminals of the battery. Some batteries are one-time use only and are thrown away when discharged. Starting-lighting-ignition (SLI) batteries are used in vehicle applications such as automobiles, trucks, boats, tractors, and other equipment. SLI batteries may vary in a variety of performance factors including nominal voltage output, maximum current output, and range of temperature operation. Different SLI batteries that otherwise exhibit similar performance properties may differ in form factors such as height, width, breadth, terminal location, terminal type, longevity, and others. When replacing a SLI battery in a vehicle, it may be desirable to replace a defunct battery by a battery that matches the defunct battery with reference both to its performance specifications and to its form factor.

SUMMARY

In an embodiment, a battery system is disclosed. The battery system comprises an electric battery and a radio frequency identity (RFID) chip. The electric battery comprises an internal metal plate and an exterior package skin. The RFID chip is retained by the exterior package skin of the electric battery and comprises a non-transitory memory, a processor, a radio transceiver coupled to the processor, an antenna, a first impedance matching component coupling the radio transceiver to the antenna, and a second impedance matching component coupling the internal metal plate of the electric battery to the radio transceiver, wherein the radio transceiver is configured to transmit radio frequency signals through the second impedance matching component to the internal metal plate and the internal metal plate is configured to radiate the radio frequency signals as radio waves.

In another embodiment, a method of providing battery information is disclosed. The method comprises harvesting electric power from an ambient near field communication (NFC) radio field by a radio frequency identity (RFID) chip that is retained by an exterior package skin of an electric battery and receiving an NFC request message for battery information by the RFID chip while powered by the ambient NFC radio field. The method further comprises, in response to the NFC request message for battery information, drawing electric power from the electric battery by the RFID chip, retrieving battery information from a non-transitory memory of the RFID chip by a processor of the RFID chip, and using electric power drawn from the electric battery by the RFID chip, transmitting the battery information through an impedance matching component of the RFID chip by the processor to a metal plate of the battery, wherein the battery information is radiated in a radio wave from the metal plate.

In yet another embodiment, another battery system is disclosed. The battery system comprises an electric battery and a radio frequency identity (RFID) chip. The electric battery comprises an internal metal plate and an exterior package skin. The RFID chip is retained by the exterior package skin of the electric battery and comprises a non-transitory memory, a processor, a radio transceiver, and an antenna. The RFID chip further comprises a first impedance matching component coupling the antenna to the radio transceiver and a second impedance matching component coupling the internal metal plate of the electric battery to the radio transceiver, wherein the RFID chip is configured to transmit radio frequency signals through the second impedance matching component to the internal metal plate and the internal metal plate is configured to radiate the radio frequency signals as radio waves. The RFID chip further comprises an application stored in the non-transitory memory that, when executed by the processor, receives an initialization message from the radio transceiver comprising a battery identity and a vehicle function identity, stores the battery identity and the vehicle function identity in the non-transitory memory, receives a battery usage record from the radio transceiver comprising information about electric load supplied by the battery and electric charge received by the battery during a usage cycle, and stores the battery usage record in the non-transitory memory. The application further receives a battery information request message from the ratio transceiver, retrieves the battery identity, the vehicle function identity, and the battery usage record from the non-transitory memory, bundles the battery identity, the vehicle function identity, and battery usage record in a battery information reply message, and transmits the battery information reply message via that radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Batteries are a vital item of equipment for cars, trucks, boats, construction equipment, and other equipment. Batteries need to be replaced regularly (e.g., a car battery may typically last about 4 years), and hence batteries are stock piled at distribution points and retail outlets for ready access when needed. Some service companies provide battery replacement services. It is desirable to easily identify and distinguish between batteries that are stored together, whereby to quickly find a needed battery and avoid selecting the wrong battery for a given installation. In the past, bar codes have been used, but bar codes can be scraped off or defaced by exposure to chemicals or vapors. Additionally, bar codes cannot be readily read when they may be hidden on the side of the battery stored among a large number of tightly packed batteries.

The present disclosure teaches a radio frequency identity (RFID) chip that is retained in or embedded in an exterior package or skin of a battery. The RFID chip comprises an internal near field communication (NFC) antenna which enables the RFID chip to harvest electrical energy from a radiated NFC field and to receive and transmit messages. But the radio signal strength that the RFID chip can transmit using the energy harvested from the ambient NFC field and using the NFC antenna may be unable to overcome interference in an inventory storage location because the structure of the batteries may impede free propagation of radio waves. The present disclosure teaches the RFID chip coupling via an impedance matching component to a metal plate in the battery and using the relatively large area of the metal plate as an antenna. Additionally, the RFID chip is able to draw electrical power from the battery to use in transmitting a radio signal via the impedance matching component and the metal plate in the battery, which may overcome the radio blocking effects of neighboring stored batteries. This battery system—incorporating a battery and an RFID chip retained by the battery skin and recruiting a metal plate as an antenna—is configured to receive and reply to a scanner that is located at a distance of from 5 to 25 feet away.

The RFID chip can store a customary unique identifier but further can store information about the performance factors of the battery, form factors of the battery, manufacturing date, usage records, and other information about the battery. For example, the RFID chip can store a material safety data sheet (MSDS) for the battery. For example, the RFID chip can store a list of vehicle makes and models with which the battery is compatible. In an embodiment, the RFID chip executes an application that reads and writes information from and to a memory. In an embodiment, the RFID chip provides differentiated access based on different keys presented by an interrogating scanner. For example, a first scanner requesting information based on presenting a first access key or password may be provided a first set of information, while a second scanner requesting information based on presenting a second access key may be provided a second set of information, where the information differs in some way (less information, more information, information not provided in the first set of information).

For example, a distribution center employee may use a first scanner to locate a plurality of batteries in a storage area of a same type for delivery to an automotive parts store. The first scanner may transmit a first access key and/or password that causes the RFID chips embedded in the skin of the batteries to self-identify themselves as belonging to the battery type requested. At another time, during a fire at the distribution center, a fireman may use a second scanner to identify hazardous materials that may be contained in the batteries stored in the distribution center. The second scanner may transmit a second access key and/or password that causes the RFID chips embedded in the skin of the batteries to enumerate the hazardous materials that those batteries contain. In an example, a lithium battery may be configurable to a safe mode and to a live mode. In the safe mode, the lithium battery may be unable or less likely to pose a threat of explosion or overheating. An RFID chip embedded in a lithium battery—or another kind of battery—and may track a history of safe mode state of the battery. A crew member of an airline plane may be able to use a third scanner to read the lithium battery in a laptop computer and determine if the battery is in safe mode. For example, the third scanner may transmit a third access key and/or password that causes the RFID chip embedded in the lithium battery to report the safe mode status of the battery. In each of these different examples, the RFID chips embedded in the batteries can differentially reply based on the access key and/or password that it receives, providing some but not all data stored by the RFID chip according to what key and/or password it receives.

The RFID chip can store information about an actual use or function associated with the battery. For example, a vehicle may have multiple batteries of the same kind installed but each battery may be connected in the vehicle to power different vehicle systems and to perform different functions. Thus, when a given battery is installed, it could perform a plurality of different services, but when connected and installed, it is committed then to performing one of those services. Information identifying the role this battery is installed to perform can be written to the RFID chip. In some cases, a plurality of batteries may collaborate to provide the same function and may be serialized as function X battery #1, function X battery #2, function X battery #3, . . . function X battery #N, and these serial numbers can be stored in the RFID chip of the battery. This information can be interrogated by a scanner at a car service center before performing diagnostics on the vehicle and/or performing maintenance and repairs on the vehicle.

Figure 1:
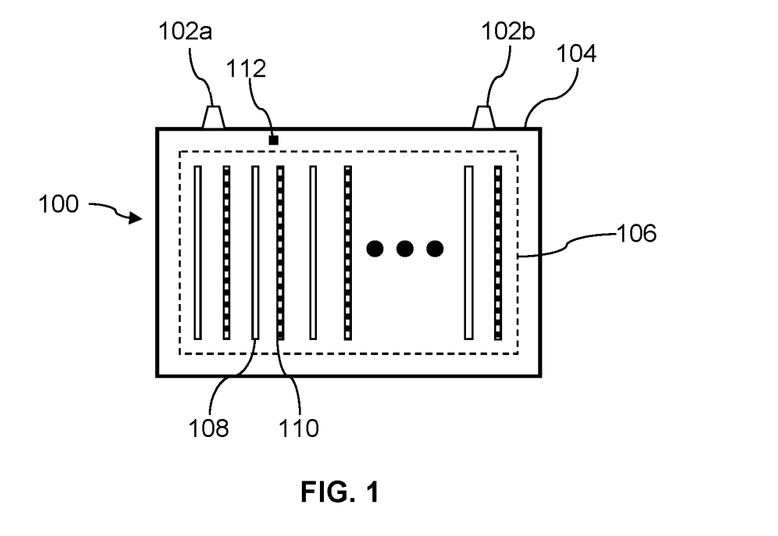
FIG. 1 is a block diagram of a battery system according to an embodiment of the disclosure.

Turning now to FIG. 1, a battery 100 is described. In an embodiment, the battery 100 comprises a first battery terminal 102a, a second battery terminal 102b, an exterior package 104 or skin, an interior tank 106, a first plurality of plates 108 of a first plate type, and a second plurality of plates 110 of a second plate type. In some contexts, the plates 108, 110 may be referred to as internal plates or as internal metal plates. In an embodiment, the battery 100 is a lead-acid battery, one plurality of plates 108, 110 comprises electrically positive plates, and the other plurality of plates 108, 110 comprises electrically negative plates. In the lead-acid battery, the electrically positive plates are lead plates covered with a paste of lead dioxide, and the electrically negative plates are lead plates made of sponge lead. The lead-acid battery further comprises an acid solution that may be referred to as an electrolyte. In other embodiments, the battery 100 is not a lead-acid battery but is another kind of battery, such as a lithium-ion type battery, a nickel-cadmium type battery, a nickel-metal hydride type of battery, or a zinc-air type of battery. The battery 100 may be configured for use as a starting, lighting, and ignition (SLI) designed to deliver electric power over a short period of time, such as in a motor vehicle. The battery 100 may be configured for use as a deep-cycle battery designed to give electric power over a sustained period of time, such as in an electric-vehicle, a boat, or as a golf cart. In the instances where the battery 100 is not a lead-acid battery, the battery 100 may still have at least one electrode that may be considered to be equivalent to one of the plurality of plates 108, 110.

The battery 100 further comprises a radio frequency identity (RFID) chip 112 that is retained by the exterior package 104. The RFID chip 112 is coupled electrically to the battery 100 so as to selectively draw electrical power from the battery 100 during at least one operating mode of the RFID chip 112. The RFID chip 112 is additionally coupled electrically to the at least one of the plates 108, 110 so as to use the plate as a radio frequency antenna.

Figure 2:
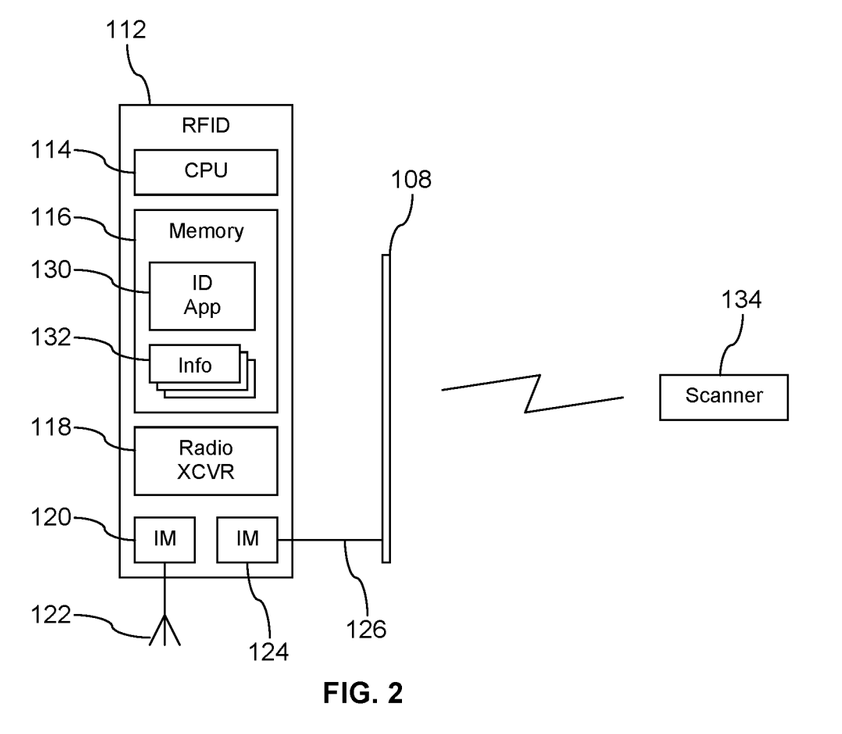
FIG. 2 is a block diagram of a radio frequency identity (RFID) chip and a battery plate according to an embodiment of the disclosure.

Turning now to FIG. 2, further details of the RFID chip 112 and its coupling to at least one of the plates 108, 110 are described. In an embodiment, the RFID chip 112 comprises a processor 114, a memory 116, a radio transceiver 118, a first impedance matching component 120, an antenna 122, a second impedance matching component 124, and a transmission line 126 coupling the second impedance matching component 124 to at least one of the plates 108 of the battery 100. The memory 116 comprises a portion that is non-transitory that stores an identity application 130. The memory 116 further comprises a plurality of items of battery information 132 stored in the non-transitory portion of the memory 116. In an embodiment, the memory 116 may comprise a transitory portion for storing temporary information that is lost when the RFID chip 112 de-powers.

A scanner 134 may attempt to read information from the RFID chip 112, for example read some or all of the items of battery information 132 stored in the memory 116. The scanner 134 may emit a first radio frequency field that provides an energy field that can be harvested by the antenna 122 that the RFID chip 112 can use to energize itself, causing the processor 114 to initialize and execute the identity application 130. The scanner 134 may emit a second radio frequency field or signal that contains an information request message.

In some operating modes of the RFID chip 112, the processor 114 executing the identity application 130 reads at least some of the battery information 132 from the memory 116, packages or bundles this information in a reply message, and provides the reply message to the radio transceiver 118 to transmit to the scanner 134. In one mode of operation of the RFID chip 112, the radio transceiver 118 transmits the reply message to the first impedance matching component 120 for transmitting via the antenna 122 to the scanner 134. In a second mode of operation of the RFID chip 112, the radio transceiver 118 transmits the reply message to the second impedance matching component 124 for transmitting via the transmission line 126 to the plate 108 within the interior tank 106 of the battery 100.

By recruiting the plate 108 for use as an antenna, the RFID chip 112 may be able to transmit the reply message to the scanner 134 in a radio environment suffering from an excess of obstructions to line-of-sight radio transmissions. A stack of batteries in an inventory store room, in some circumstances, constitutes just such a radio environment suffering from an excess of obstructions to line-of-sight radio transmissions. The physical size of the plate 108 being larger than the antenna 122, it may be able to transmit a more powerful radio signal in some environments and overcome the obstacles posed by environment. In some circumstances, the RFID chip 112 may draw electrical power from the battery 100 to generate a more powerful radio signal for transmission through the second impedance matching component 124, over the transmission line 126, and via the plate 108 of the battery. While a single radio transceiver 118 is illustrated in FIG. 2, in an embodiment, the RFID chip 112 may comprise a first radio transceiver for use with the first impedance matching component 120 and the antenna 122 (e.g., a low power radio signal generated using electric power captured from the energy radio signal transmitted by the scanner 126) and may comprise a second radio transceiver for use with the second impedance matching component 124 (e.g., a high power radio signal generated using electric power drawn from the battery 100).

The battery information 132 may comprise a wide variety of different information. The battery information 132 may comprise an identity or serial number of the RFID chip 112. The battery information 132 may comprise battery lifecycle information such as an identity of a manufacturer of the battery 100, a date of manufacture of the battery 100, the date of installation of the battery 100 into a system (e.g., into a vehicle). The battery information 132 may comprise battery configuration and/or specification information such as a nominal operating voltage, a nominal current delivery (e.g., number of "cold cranking amps"), an amp-hour energy rating, a make of the battery 100, a model of the battery 100. The battery information 132 may comprise compatibility information, for example a list of makes and models of vehicles with which the battery 100 is compatible (e.g., meet the functional and fit requirements of the subject vehicles). The battery information 132 may comprise information like a functional role assigned to the battery 100 in a system and/or a series number of the battery 100 relative to other batteries 100 assigned to the same function in the same system (a first traction battery, a second traction battery, a third traction battery, etc.). The battery information 132 may comprise a material safety data sheet (MSDS) associated with the battery 100. The battery information 132 may comprise battery usage history about a use of the battery, for example information about charging and discharging cycles.

In an embodiment, the scanner 134 may be a scanner device used by an inventory control worker. The inventory control worker may desire to identify a battery suitable to a specific need in a store room containing a variety of different batteries. For example, a road-side assistance worker may desire to find a battery suitable for installation into a specific make and model of car, where the car is broke-down on a highway. The scanner 134 may send a request message requesting the identity application 130 on the battery 100 (or a plurality of batteries 100 in a store room) to reply with some or all of the battery information 132. In an embodiment, the scanner 134 may send a request message that requests a selection of the battery information 132, for example a nominal current delivery and an amp-hour energy rating. In an embodiment, the scanner 134 may send a request message that requests a selection of the battery information 132, for example compatibility information. In an embodiment, the scanner 134 may send a request message that identifies a specific make and model of vehicle, the identity application 130 of the RFID chips 112 of the batteries 100 may search for the make and model identified in the request message in their compatibility list, and reply with a supported/unsupported indication in the returned reply message.

In an embodiment, the scanner 134 may be a scanner device used by an emergency responder, such as a fireman or an ambulance team member. The scanner 134 may send a request message to the RFID chip 112 of the battery 100 in a vehicle involved in an automobile accident. If it is operable, the RFID chip 112 may receive the request message, the identity application 130 may read selected information from the battery information 132, and the radio transceiver 118 may transmit the information to the scanner 134 as described above. In an embodiment, the identity application 130 may evaluate a condition of the battery 100, for example to determine if it is in a safe mode of operation or not. The identity application 130 may be able to identify if the battery 100 is discharging at a high current rate, is discharging with a modest current rate, or is not discharging discernible current. The identity application 130 may be able to identify if the battery 100 is losing fluid and hence infer if the interior tank 106 of the battery 100 has been ruptured. The identity application 130 can provide the status of the battery 100 in a reply message to the scanner 134.

In an embodiment, the scanner 134 may be coupled to a controller area network (CAN) bus in a vehicle that the battery 100 is installed in. The CAN bus, or a telematics unit coupled to the CAN bus, may build a record of battery usage and periodically send battery usage records to the RFID chip 112 via the scanner 134 coupled to the CAN bus. The CAN bus (or telematics unit) may supervise electric power system in the vehicle and monitor parameters such as discharge currents and charging currents and provide that information in the record of battery usage.

In an embodiment, the scanner 134 may be linked to an auto shop service center computer. The identity application 130 may look up battery information 132 that comprises lifecycle information, battery configuration and/or specification information, and functional information. This can be used by a diagnostic computer system at the auto shop to do some preliminary analysis of a vehicle in which the battery 100 is installed. The scanner 134 coupled to the diagnostic computer system may request a battery usage record from the RFID chip 112. In an embodiment, the RFID chip 112 may communicate with a scanner 134 that is coupled to a controller area network (CAN) bus that is installed in the vehicle containing the battery 100, and the CAN bus may report to the auto shop service center computer.

The identity application 130 may search the request message that it receives to find out if a key or credential is provided in the request message. If there is no key or credential information included, the identity application 130 may cause the radio transceiver 118 to reply with a minimum amount of information, for example transmitting only an identity or serial number of the RFID chip 112. Different keys or credential information may be provided to different stakeholders to authorize access to different parts of the battery information 132. Thus, the identity application 130 can provide access restrictions based on the keys or credential information presented. Said in another way, the identity application 130 returns battery information 132 selected from at least one of battery lifecycle information, battery configuration information, battery specification information, compatibility information, a material safety data sheet associated with the battery, and battery usage history information based on the key.

The identity application 130 can also evaluate whether the RFID chip 112 can communicate with the scanner 134 using energy harvested from the ambient radio power field emitted by the scanner 134 or whether the RFID chip 112 should instead draw electrical power from the battery 100 and use the second impedance matching component 124, the transmission line 126, and the plate 108 to transmit information. In an embodiment, the identity application 130 evaluates a signal strength received by the antenna 122 from the scanner 134 and causes the radio transceiver 118 to transmit through the first impedance matching component 120 when the signal strength is above a first threshold and causes the radio transceiver 118 to transmit through the second impedance matching component 124 when the signal strength is below a second threshold, where the second threshold is less than the first threshold. In some contexts this may be referred to as the RFID chip 112 drawing electric power from the battery 100 in a first mode of operation and harvesting energy from the ambient radio field in a second mode of operation. In some cases, the decision of whether to draw battery power and use the second impedance matching component 124, the transmission line 126, and the plate 108 to transmit information may be linked to the key or confidential information provided by the scanner 134.

Figure 3:
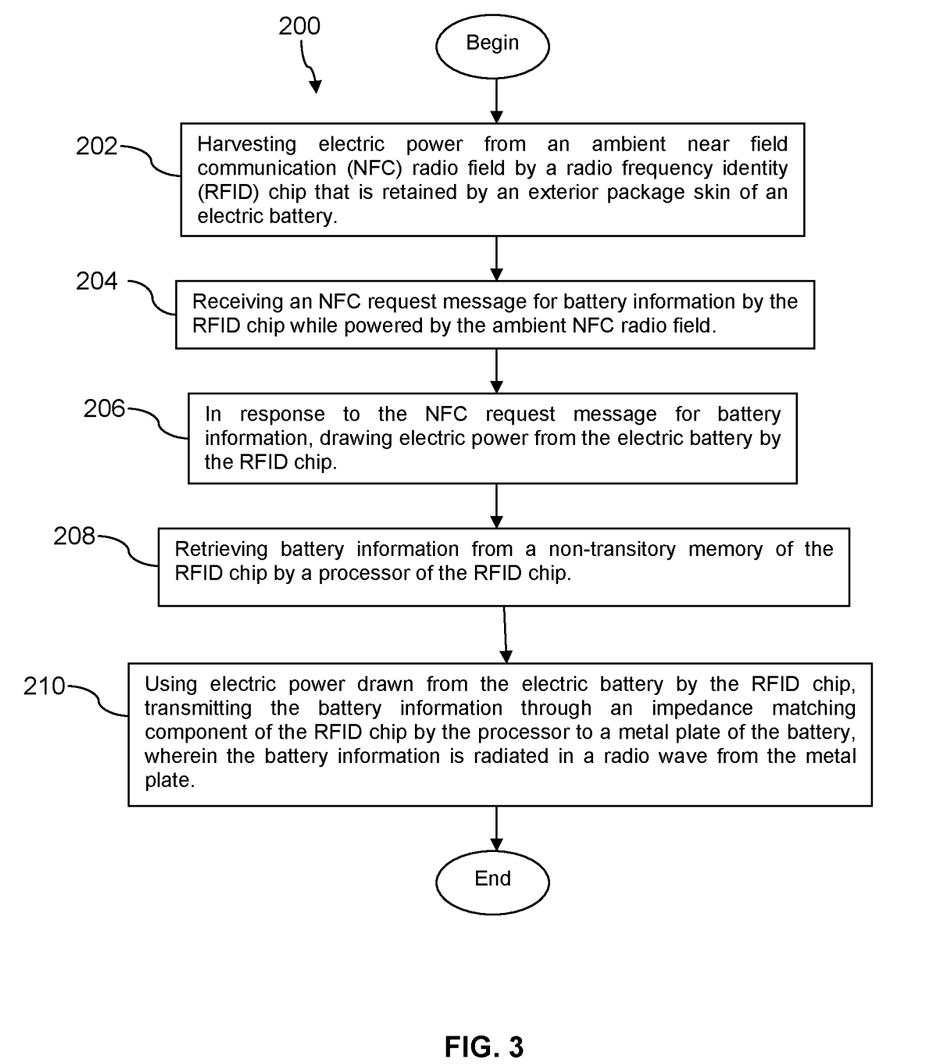
FIG. 3 is a flow chart of a method according to an embodiment of the disclosure.

FIG. 3 is a flow chart of a method 200 for providing battery information. At block 202, the method 200 comprises harvesting electric power from an ambient near field communication (NFC) radio field by a radio frequency identity (RFID) chip that is retained by an exterior package skin of an electric battery. At block 204, the method 200 comprises receiving an NFC request message for battery information by the RFID chip while powered by the ambient NFC radio field. At block 206, the method 200 comprises, in response to the NFC request message for battery information, drawing electric power from the electric battery by the RFID chip.

At block 208, the method 200 comprises retrieving battery information from a non-transitory memory of the RFID chip by a processor of the RFID chip. At block 210, the method 200 comprises using electric power drawn from the electric battery by the RFID chip, transmitting the battery information through an impedance matching component of the RFID chip by the processor to a metal plate of the battery, wherein the battery information is radiated in a radio wave from the metal plate.

Figure 4:
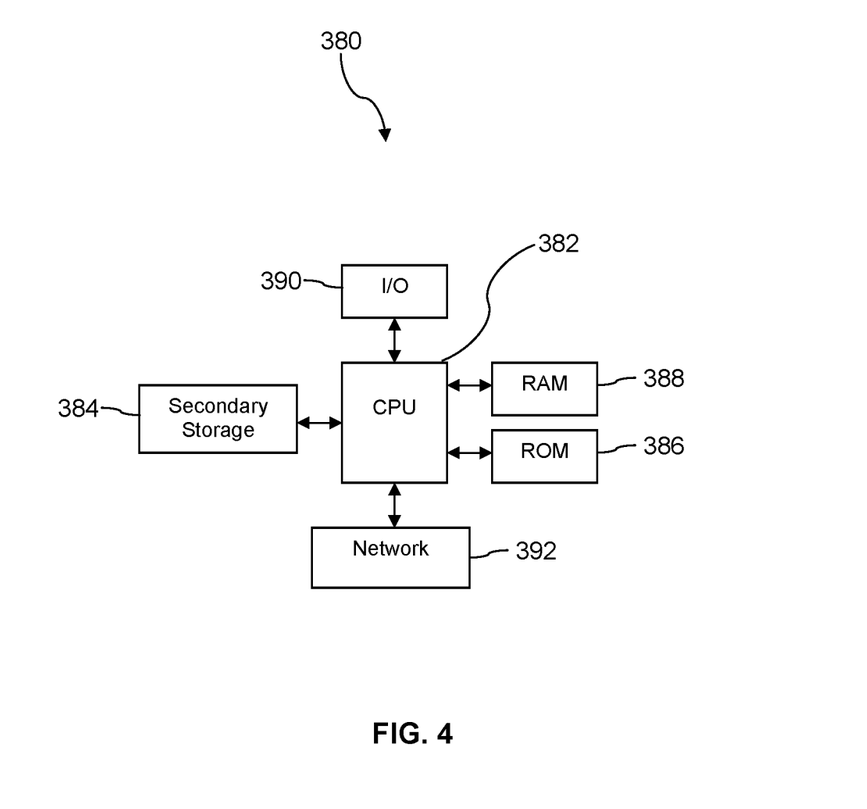
FIG. 4 is a block diagram of a computer system according to an embodiment of the disclosure.

FIG. 4 illustrates a computer system 380 suitable for implementing one or more embodiments disclosed herein. The RFID chip 112 may be viewed, in part, as a computer system. The scanner 130 may be viewed, in part, as a computer system. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non- transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A battery system, comprising:
   an electric battery, comprising:
      an internal metal plate, and
      an exterior package skin; and
   a radio frequency identity (RFID) chip retained by the exterior package skin of the electric battery, comprising:
      a non-transitory memory,
      a processor,
      a radio transceiver,
      an antenna,
      a first impedance matching component coupling the antenna to the radio transceiver,
      a second impedance matching component coupling the internal metal plate of the electric battery to the radio transceiver, wherein the RFID chip is configured to transmit radio frequency signals through the second impedance matching component to the internal metal plate and the internal metal plate is configured to radiate the radio frequency signals as radio waves, and wherein the RFID tag is configured to operate in different modes of operation including a first mode of operation where the radio transceiver transmits via the antenna through the first impedance matching component and a second mode of operation where the radio transceiver transmits via the internal metal plate through the second impedance matching component, and
      an application stored in the non-transitory memory that, when executed by the processor, is configured to:
         receive an initialization message from the radio transceiver comprising a battery identity and a vehicle function identity,
         store the battery identity and the vehicle function identity in the non-transitory memory,
         receive a battery usage record from the radio transceiver comprising information about electric load supplied by the battery and electric charge received by the battery during a usage cycle,
         store the battery usage record in the non-transitory memory,
         receive a battery information request message from the radio transceiver,
         retrieve the battery identity, the vehicle function identity, and the battery usage record from the non-transitory memory,
         bundle the battery identity, the vehicle function identity, and battery usage record in a battery information reply message, and
         transmit the battery information reply message via the radio transceiver via the first mode of operation or the second mode of operation.

2. The battery system of claim 1, where the battery usage record is received from a radio transceiver coupled to a controller area network (CAN) in a vehicle.

3. The battery system of claim 1, where the battery usage request message is received from a scanner coupled to an automobile service center computer.

4. The battery system of claim 1, wherein the electric battery is a lead-acid battery.

5. The battery system of claim 1, wherein the electric battery is one of a lithium-ion type battery, a nickel-cadmium type battery, a nickel-metal hydride type battery, or a zinc-air type battery.

6. The battery system of claim 1, where the RFID chip draws electric power from the electric battery in the second mode of operation and harvests electric power from an ambient radio field in the first mode of operation.

7. A battery system, comprising:
an electric battery, comprising:
an internal metal plate, and
an exterior package skin; and
a radio frequency identity (RFID) chip retained by the exterior package skin of the electric battery, comprising:
a non-transitory memory,
a processor,
a radio transceiver coupled to the processor,
an antenna,
a first impedance matching component coupling the radio transceiver to the antenna, and
a second impedance matching component coupling the internal metal plate of the electric battery to the radio transceiver, wherein the radio transceiver is configured to transmit radio frequency signals through the second impedance matching component to the internal metal plate and the internal metal plate is configured to radiate the radio frequency signals as radio waves, and wherein the RFID tag is configured to operate in different modes of operation including a first mode of operation where the radio transceiver transmits via the antenna through the first impedance matching component and a second mode of operation where the radio transceiver transmits via the internal metal plate through the second impedance matching component.

8. The battery system of claim 7, wherein the second impedance matching component couples the internal metal plate to the radio transceiver via a transmission line.

9. The battery system of claim 7, where the RFID chip comprises an identity application stored in the non-transitory memory that, when executed by the processor, evaluates a signal strength received by the antenna from a scanner and causes the radio transceiver to transmit through the first impedance matching component when the signal strength is above a first threshold and causes the radio transceiver to transmit through the second impedance matching component when the signal strength is below a second threshold, where the second threshold is less than the first threshold.

10. The battery system of claim 7, where the RFID chip comprises an identity application stored in the non-transitory memory that, when executed by the processor, responds to a request message received by the radio transceiver from a scanner by accessing battery information stored in the non-transitory memory, storing the accessed battery information in a reply message, and causing the radio transceiver to transmit the reply message.

11. The battery system of claim 10, wherein the battery information comprises information selected from at least one of battery lifecycle information, battery configuration information, battery specification information, compatibility information, a material safety data sheet associated with the battery, and battery usage history information.

12. The battery system of claim 10, wherein the request message comprises a key and the application returns battery information selected from at least one of battery lifecycle information, battery configuration information, battery specification information, compatibility information, a material safety data sheet associated with the battery, and battery usage history information based on the key.

13. The battery system of claim 7, where the RFID chip draws electrical power from the electric battery.

14. The battery system of claim 7, where the RFID chip comprises an identity application stored in the non-transitory memory that, when executed by the processor, evaluates an electrical power harvested from a radio field and when the electrical power is less than a predefined energy threshold draws electrical power from the electric battery.

* * * * *